United States Patent [19]

Molitor

[11] 4,124,021

[45] Nov. 7, 1978

[54] MAKEUP AIR TEMPERING FOR GREASE EXTRACTION VENTILATOR

[75] Inventor: Victor D. Molitor, Denver, Colo.

[73] Assignee: Stainless Equipment Company, Englewood, Colo.

[21] Appl. No.: 768,152

[22] Filed: Feb. 14, 1977

Related U.S. Application Data

[63] Continuation-in-part of Ser. No. 602,685, Aug. 7, 1975, abandoned.

[51] Int. Cl.² .............................................. F24C 15/20
[52] U.S. Cl. .................................. 126/299 E; 55/222; 55/228; 55/229; 55/269; 55/DIG. 36; 210/532 R
[58] Field of Search ................ 55/222, 229, 239, 244, 55/267-269, DIG. 36, 227, 228, 242, 421; 98/115 R; 126/299 R, 299 L, 299 D, 299 E, 299 F; 210/294, 525, 532 R

[56] References Cited

U.S. PATENT DOCUMENTS

| | | | |
|---|---|---|---|
| 1,815,570 | 7/1931 | Jones | 55/269 |
| 1,828,477 | 10/1931 | Seligman | 165/164 |
| 2,401,797 | 6/1946 | Rasmussen | 165/164 |
| 2,621,903 | 12/1952 | Cohler | 165/164 |
| 2,633,929 | 4/1953 | Farr | 55/242 |
| 3,147,800 | 9/1964 | Tadewald | 165/164 |
| 3,260,189 | 7/1966 | Jensen | 55/269 |
| 3,272,260 | 9/1966 | Raub et al. | 165/164 |
| 3,324,629 | 6/1967 | Graswich et al. | 55/229 |
| 3,415,316 | 12/1968 | Burne et al. | 165/164 |
| 3,595,310 | 7/1971 | Burne et al. | 165/164 |
| 3,664,255 | 5/1972 | Kuechler | 98/115 K |
| 3,698,378 | 10/1972 | Rosenberg et al. | 126/299 B |
| 3,785,124 | 1/1974 | Gaylord | 55/242 |
| 3,827,343 | 8/1974 | Darm | 98/115 K |
| 3,841,062 | 10/1974 | Molitor et al. | 55/244 |
| 3,854,388 | 12/1974 | King | 55/242 |
| 3,980,072 | 9/1976 | Jacobs | 126/299 D |
| 4,011,802 | 3/1977 | Molitor et al. | 55/244 |

*Primary Examiner*—Frank W. Lutter
*Assistant Examiner*—David L. Lacey
*Attorney, Agent, or Firm*—Horace B. Van Valkenburgh; Frank C. Lowe

[57] ABSTRACT

A grease extraction ventilator includes a water bath or water sprays into or through which are directed the products of the gaseous stream rising from cooking equipment and which tends to maintain an ambient temperature. This water is pumped through a heat exchanger for a portion of incoming makeup air directed into the room, the remainder of which is directed toward the intake for smoke and the like, to reduce the amount of air withdrawn from the room by the suction blower. The heat exchanger may also be utilized at a desired location, within or outside of the room in which the ventilator is installed, to heat or cool air or other fluids for heating or other purposes. Air may be directed into the upper portion of the room, such as adjacent the ceiling through a horizontal slot which causes the air to move horizontally to mix with the highest temperature air in the room and flow to portions of the room spaced from the ventilator, thereby avoiding drafts blowing against the cooking personnel. An air chamber adjacent the ventilator has a front wall and a discharge outlet on the underside which directs makeup air toward the ventilator intake. To reduce an undesired flow of air from the lower edge of the front wall, which may produce a flow of smoke and the like into the room, an orifice adjacent the horizontal slot may direct makeup air downwardly along the front wall.

19 Claims, 22 Drawing Figures

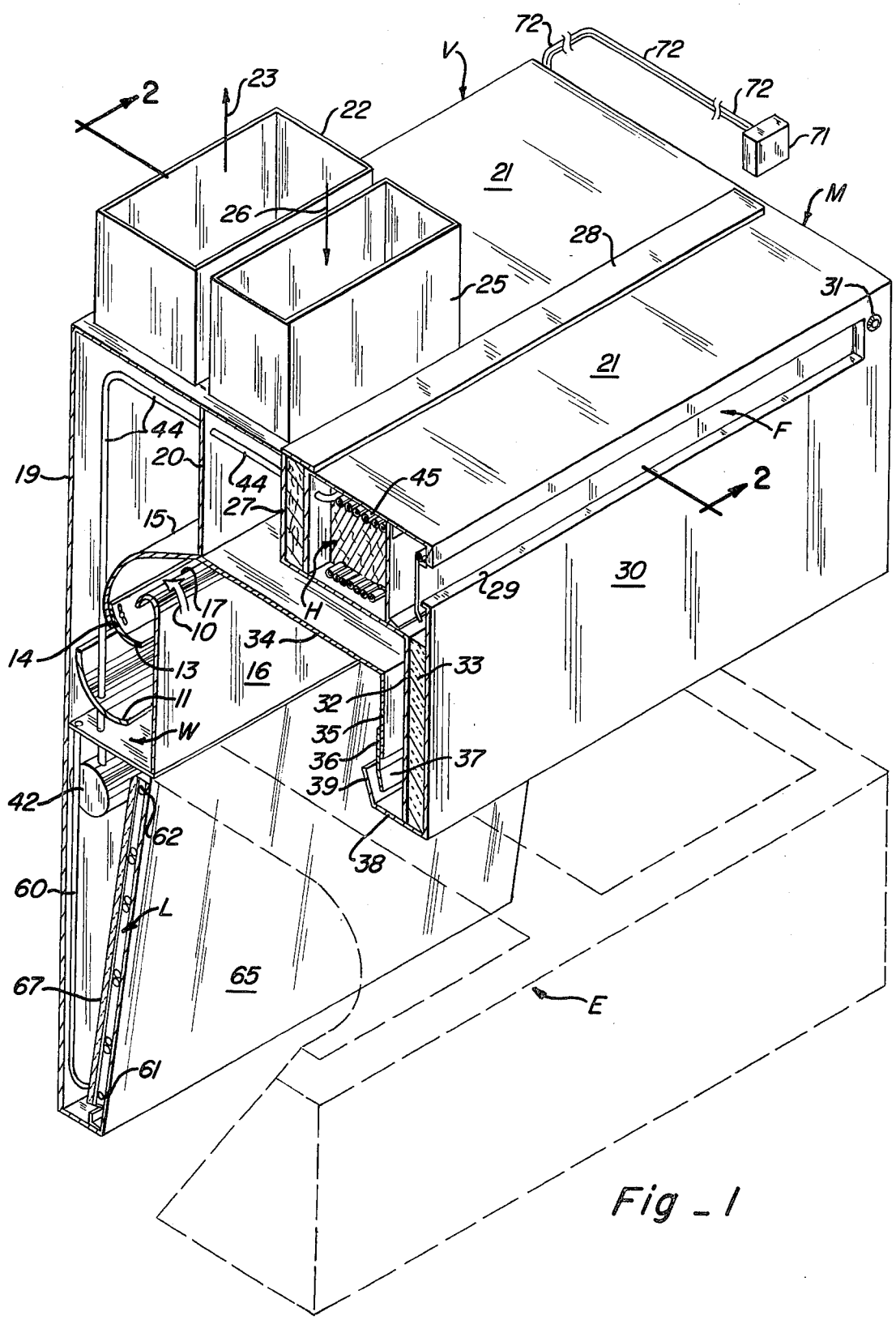
Fig_1

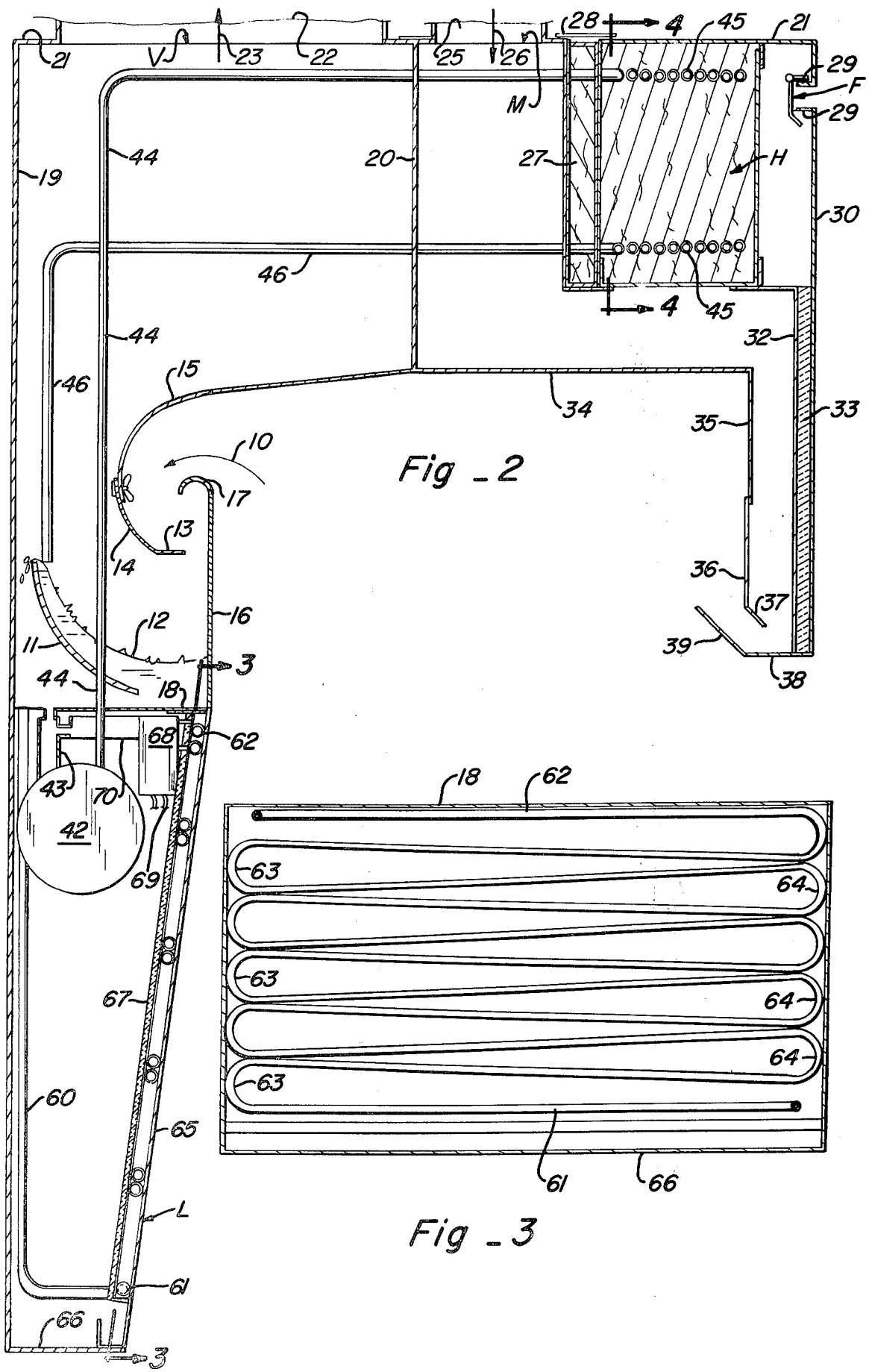

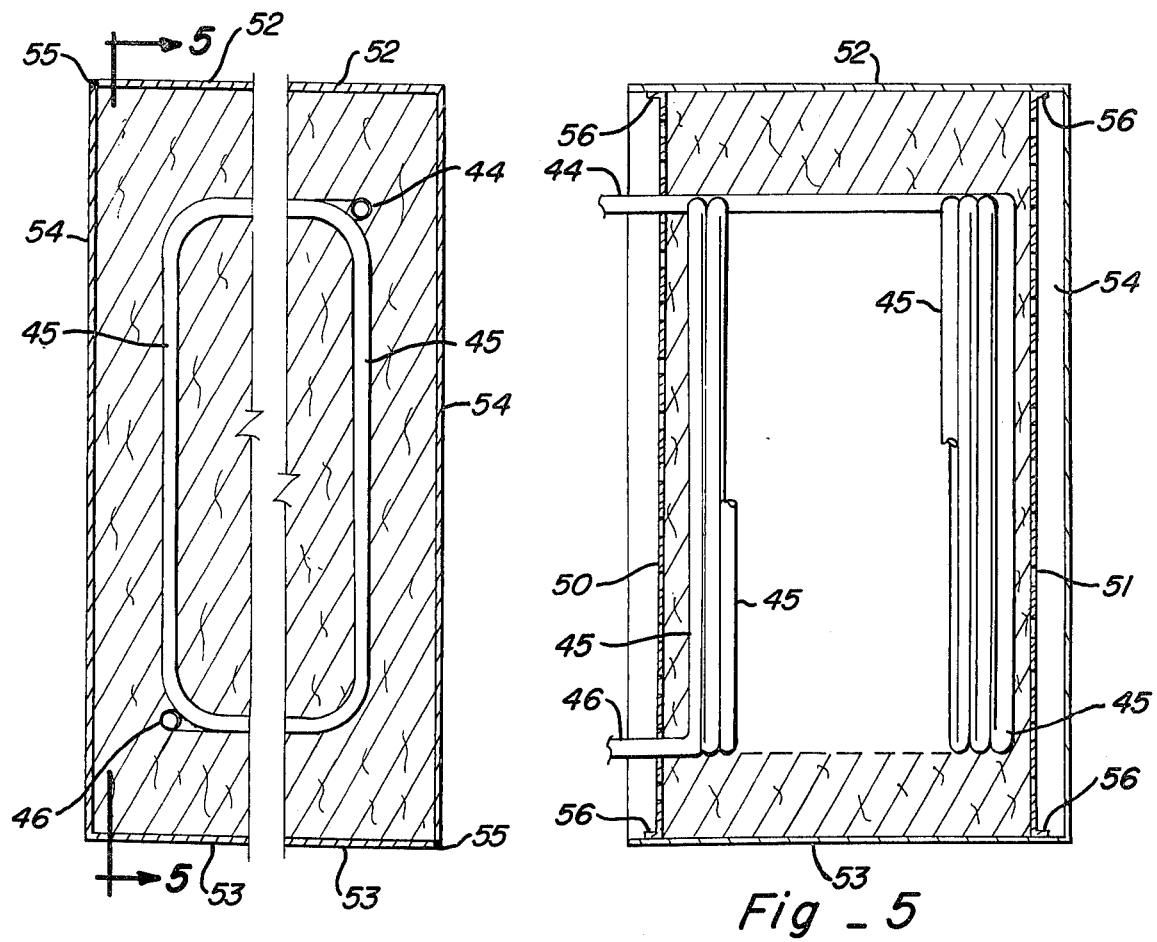
Fig _ 4
Fig _ 5
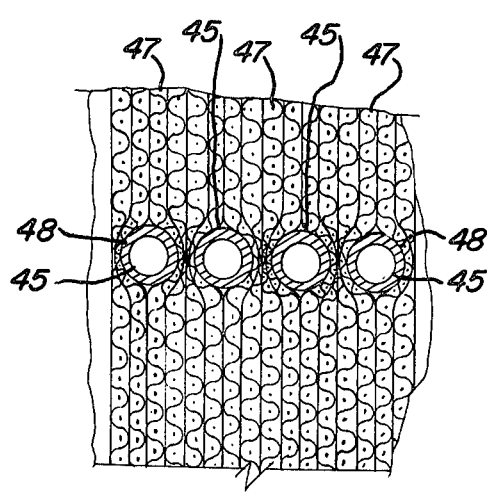
Fig _ 6
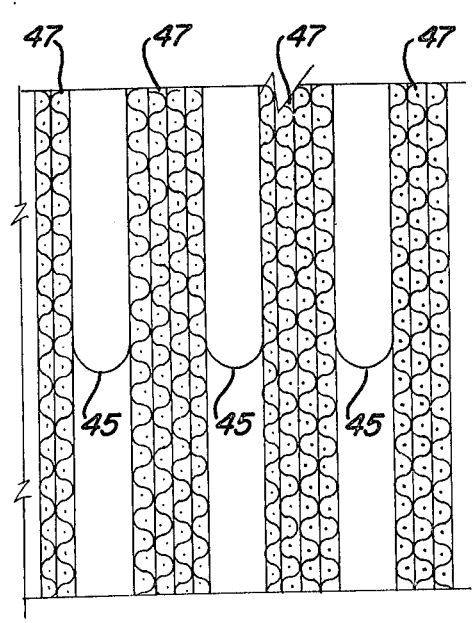
Fig _ 7

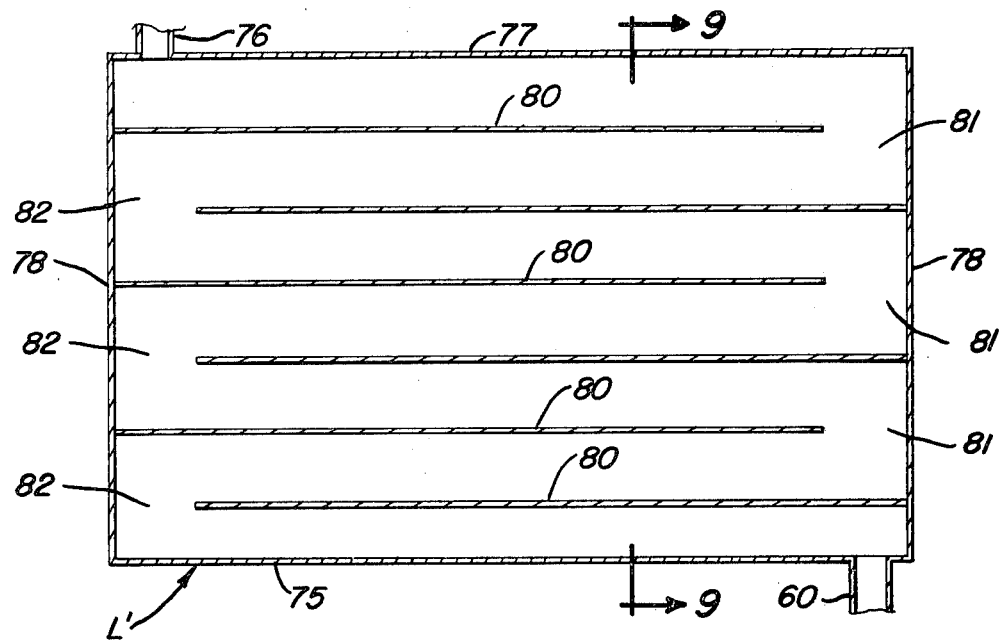
Fig_8
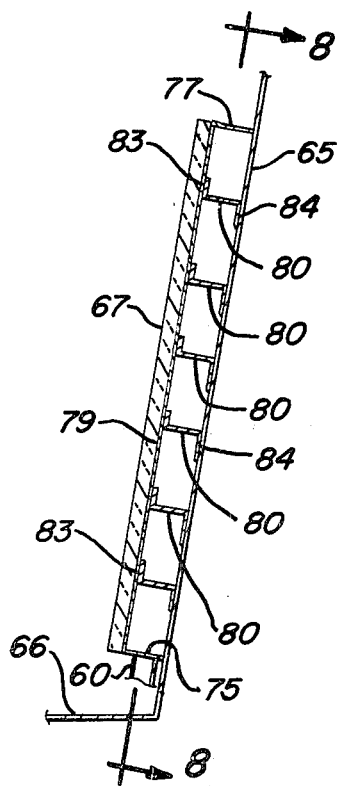
Fig_9

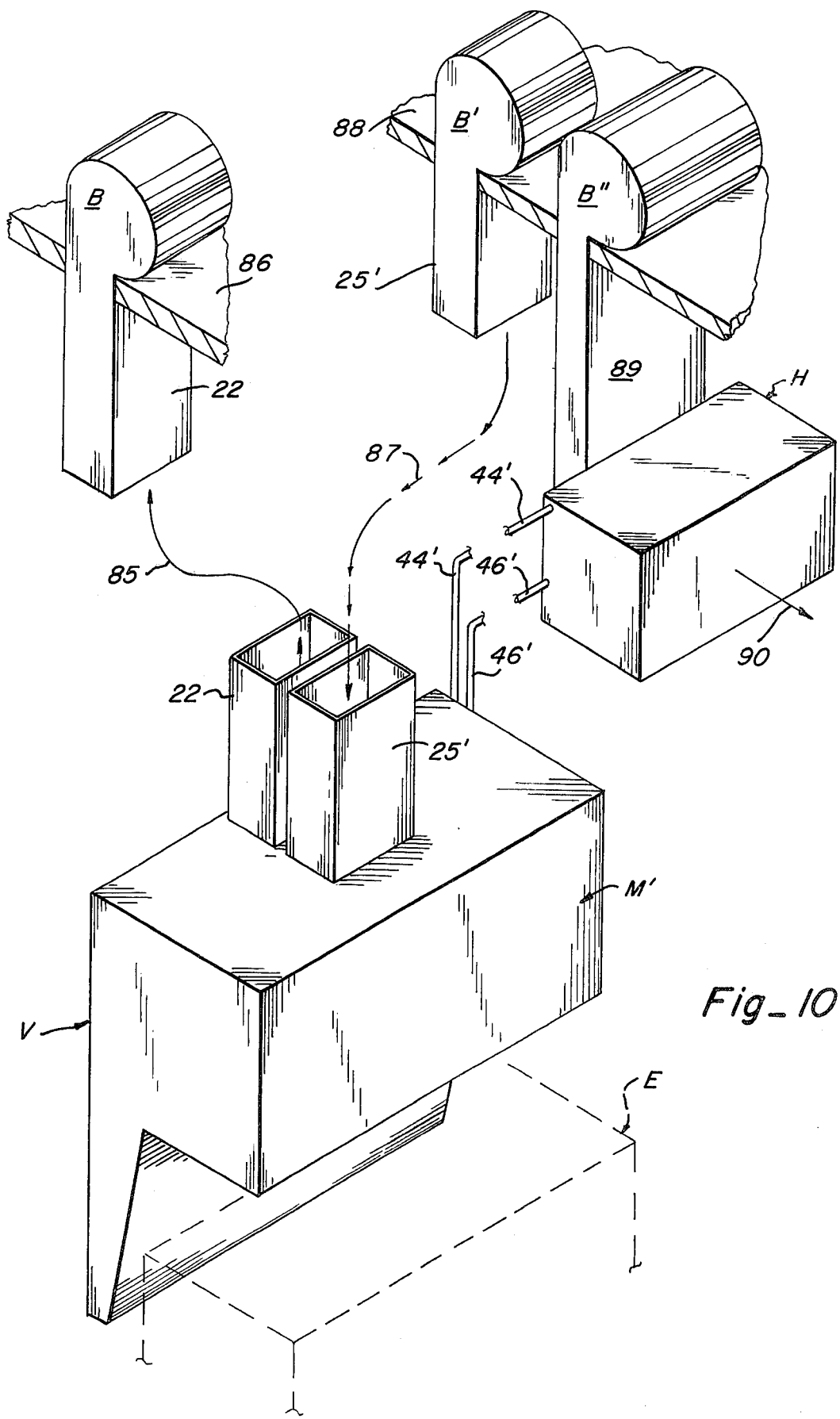
Fig_10

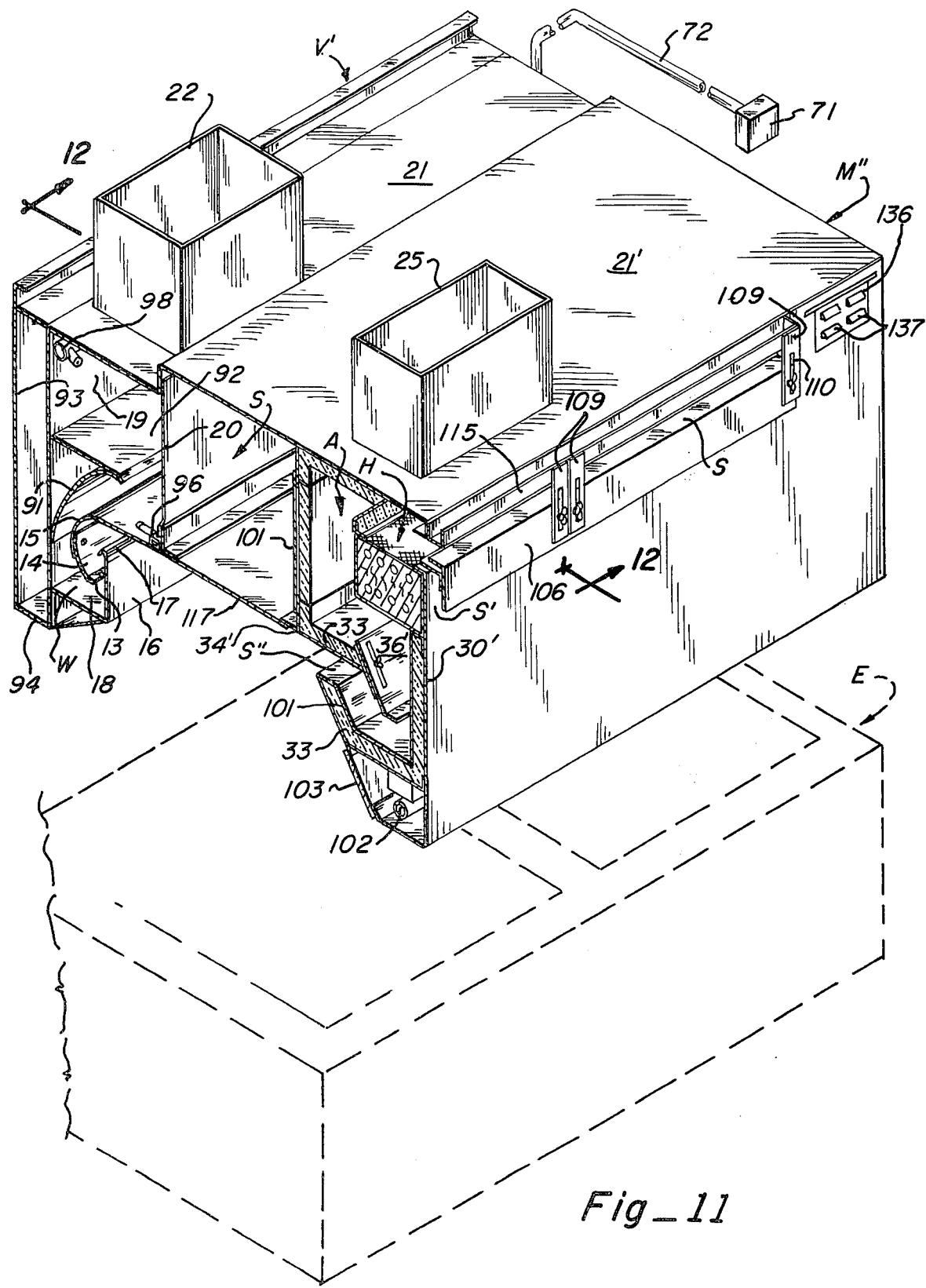
Fig_11

MAKEUP AIR TEMPERING FOR GREASE EXTRACTION VENTILATOR

This application is a continuation-in-part of my co-pending application Ser. No. 602,685, filed Aug. 7, 1975, and now abandoned.

This invention relates to the tempering of makeup air for a grease extraction ventilator, such as that of U.S. Pat. No. 3,841,062 of Oct. 15, 1974.

Grease extraction ventilators are utilized for removing smoke or grease particles, fumes and the like from cooking equipment, such as stoves, ranges, broilers and the like. The grease extraction ventilator of the above patent prevents the accumulation of grease in the ventilator and extracts the grease without permitting greasy vapors and similar contaminants to escape through the flue into the outside air. Often, the suction effect of the ventilator results in air being removed from the room along with the smoke, fumes and the like. Thus, it is desirable to provide makeup air for the room in which the grease extraction ventilator is installed above cooking equipment. When the outside temperature is low, such as below 60° F. or even lower, such as below freezing, the air pulled through the ventilator from the room is air which has been heated to room temperature, while the supply of makeup air normally has the outside temperature. Thus, although a makeup air device for grease extraction ventilators provides makeup air for the room in which some of the air heated to room temperature is withdrawn through the ventilator, it replaces this room air with air at the outside temperature, rather than the room temperature.

The grease extraction ventilator of the above U.S. Pat. No. 3,841,062 is ideally constructed to utilize the principles of this invention. Thus, this grease extraction ventilator includes a water bath into which the gaseous stream from the cooking equipment which includes fumes, smoke, grease and the like is directed and which agitates the water bath, so that the grease, fumes, smoke and the like are carried back into the water bath by the droplets of water produced by agitation. There are also grease extraction ventilators which operate by spraying water into or across the path of the gaseous stream and in which this water is collected in a pool beneath the spray device or devices. Some of these water spray ventilators also include means for recirculating the collected water spray through the sprays after filtering out grease, solid particles and the like. In each instance, the water of the water bath, or the water sprayed through the smoke, fumes, grease and the like, will be suitable as a heat transfer medium for tempering makeup air or other purposes. Thus, when the outside temperature is high, the air being tempered may be cooled, while when the outside temperature is low, the air being tempered may be heated. The tendency for the water of the water bath or that collected from sprays to maintain an ambient temperature is apparently due to the balance between the cooling effect of evaporation of water and the heating effect of the latent heat of fumes, vapors and gases from the cooking equipment. The ambient temperature may also result from the fact that the higher the temperature of air carrying smoke, fumes, vapors and the like, the lower is its humidity, so that additional water is evaporated, which compensates for the higher temperature of the air and smoke and the like. Also, a lower temperature of the water bath may be achieved by increasing the air and vapor flow through the evaporator.

Among the objects of this invention are to provide apparatus which will utilize the collected water of a grease extraction ventilator for tempering the makeup air to be delivered into the room in which the cooking equipment and ventilator are installed, or to another room area, or for other purposes; to provide such apparatus which will permit the adjustment of the amount of tempering of the makeup air; to provide such apparatus in which the amount of makeup air directed into a room or the like may be controlled; to provide such apparatus in which the amount of heat transferred to the makeup air may be controlled through a thermostat or the like installed in the room into which the air is discharged; and to provide such apparatus which is relatively simple in construction, yet efficient and effective in operation.

The foregoing objects are broadly achieved by passing the water from the water bath or collection of sprayed water through a heat exchanger in order to temper the incoming makeup air.

Further objects of the invention are to provide apparatus which will produce an effective circulation of tempered air, to avoid drafts of cycled air against cooking personnel; to provide such apparatus which will provide an auxiliary flow of air which prevents the primary makeup air stream from producing a vacuum which draws smoke or fumes from the cooking area and permits the same to curl around the lower front edge of a downwardly extending leg of an air chamber; to provide such apparatus which will cause tempered air to be directed in a horizontal stream, at or parallel to the ceiling of the room, so that the mixing of the tempered air with the normally highest temperature air in the room will occur above the cooking personnel; and to provide such apparatus which is efficient and effective in operation.

The foregoing and additional objects, as well as the advantages and novel features of this invention, will become apparent from the description which follows, taken in conjunction with the accompanying drawings, in which:

FIG. 1 is a front perspective view of a grease extraction ventilator embodying this invention, partially broken away to show the interior construction, with a broiler or other cooking equipment shown in dot-dash lines.

FIG. 2 is a central vertical section, taken along line 2—2 of FIG. 1.

FIG. 3 is an oblique, lateral section taken along line 3—3 of FIG. 2 and showing particularly a lower liquid heating device.

FIG. 4 is a fragmentary, vertical section taken along line 4—4 of FIG. 2 on an enlarged scale, turned 90° and showing particularly a liquid-air heat exchanger for tempering makeup air to be diverted to the room.

FIG. 5 is a vertical section, also turned 90° and taken along line 5—5 of FIG. 4.

FIG. 6 is a fragmentary section of a portion of the coils of the heat exchanger of FIG. 4, showing particularly the metal mesh layers compressed against the coils.

FIG. 7 is a fragmentary section, taken transversely to FIG. 6 and showing the initial condition of the mesh layers between the coils, prior to compression.

FIG. 8 is an oblique section similar to FIG. 3 but taken along line 8—8 of FIG. 9 and showing an alternative lower liquid heating device.

FIG. 9 is a vertical section taken along line 9—9 of FIG. 8.

FIG. 10 is a partially diagrammatic, condensed perspective view showing an alternative arrangement wherein the air to be treated by heat exchange with liquid from the ventilator is supplied to a heat exchanger separate or remote from the ventilator.

FIG. 11 is a perspective and cross sectional view of an alternative grease extraction ventilator and associated attachment for furnishing makeup air to the ventilator and to the room in which it is installed.

Figure 12:
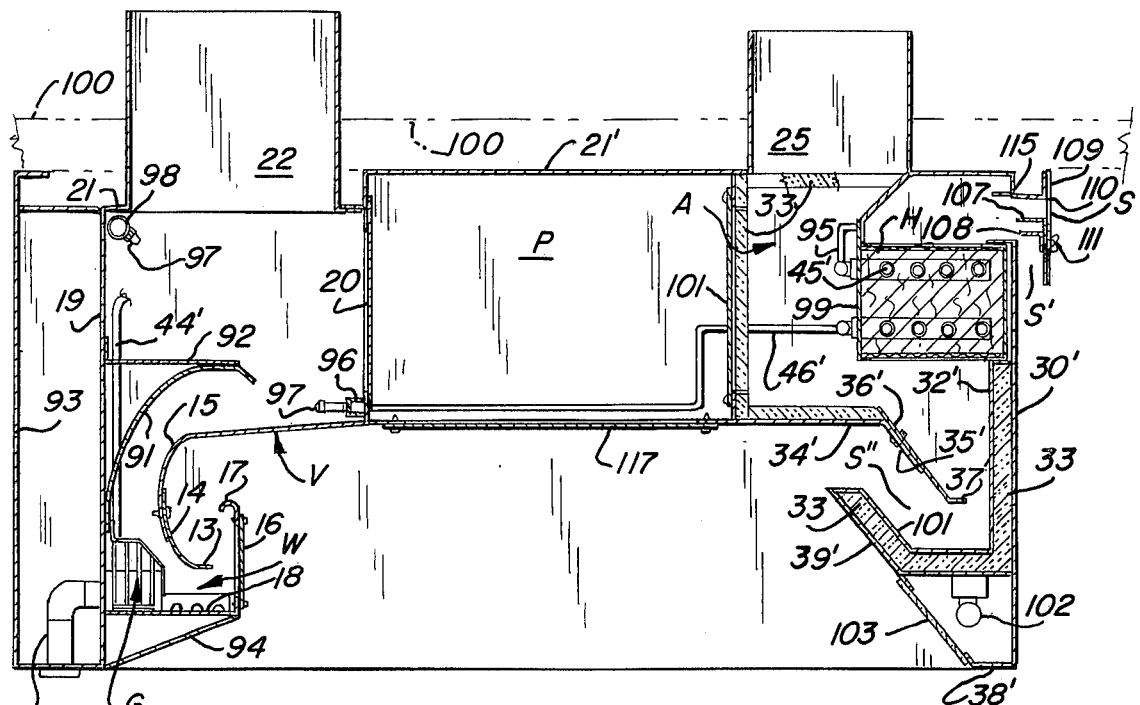
FIG. 12 is a transverse cross section of the ventilator and attachment taken along line 12—12 of FIG. 11.

One embodiment of a grease extraction ventilator constructed in accordance with this invention, as in FIGS. 1 and 2, may include a ventilator V and a makeup air device M installed over cooking equipment E, which may include one or more of a range, stove, broiler or the like, or a series of the same, with the side to side width of the ventilator and makeup air device corresponding to the width of the cooking equipment. The ventilator V is provided with a water chamber W, which removes the grease, fumes, smoke and other vapors of the gaseous stream emanating from the cooking equipment E and moving into the ventilator in the direction of arrow 10. In passing through the ventilator, the heated fumes, grease, vapors and the like churn the water bath and move it into an angularly disposed, curved baffle 11, so that the upper edge of the water, which is normally horizontal, will assume generally the contour 12 shown in FIG. 2. The impingement against the water of the products entering the ventilator is controlled by the position of a lip 13 of an adjustable, concave plate 14 mounted on a downwardly extending, concave plate 15. The position of the lip 13 and also the distance between its edge and a front plate 16 determines the amount of air and other gases drawn through the ventilator by the suction fan. Front plate 16 is provided with a convex lip 17 at its upper edge, while the water chamber W is enclosed by front plate 16, a bottom plate 18 and a rear wall 19 of the ventilator. The preferred construction includes additional baffles above the concave plate 15, the same being disclosed in the aforesaid U.S. Pat. No. 3,841,062. The ventilator V and makeup air device M have a common wall 20, as well as a common top 21, while the air which has been stripped of grease and smoke by water may contain gases, such as $CO_2$, which exhaust through duct 22 in the direction of arrow 23.

A suitable suction fan for discharging the exhaust air and gas to the atmosphere may be installed in a continuation of duct 22 in a conventional manner. A suitable intake for makeup air may be installed a spaced distance from the exhaust air and gas discharge, to prevent direct recirculation of undesirable gases, such as $CO_2$, while the opposite end of duct 25 is connected to the intake in which a blower is installed, so that the makeup air will be pushed through the duct and into the makeup air device, in the direction of arrow 26. In general, the makeup air flows into the makeup air device, with a portion passing through a heat exchanger H, for discharge into the room through an adjustable flap F. Access to the lint filter 27 is obtained through a removable plate 28. The flap valve F is pivotally mounted on inwardly extending flanges 29 of the front wall 30 of the makeup air device, with an adjustment screw 31 at each end of the flap to adjust its angular position. An intermediate plate 32 extends downwardly in spaced relation to the front wall 30 to receive insulation 33 which is adapted to deter condensation on front wall 30 due to cooling by the diverted makeup air when the outside temperature is relatively low. The makeup air device is also provided with a bottom plate 34 and a passage for makeup air thereby delivered to the ventilator between intermediate plate 32 and a rear wall 35. A depending plate 36, provided with a lower angular lip 37, is adjustable upwardly and downwardly of rear wall 35, i.e. toward or away from bottom wall 38, while an upwardly inclined flange 39, along with lip 37, controls the area of the opening through which the makeup air for the ventilator itself is discharged, toward the ventilator inlet opening at arrow 10.

As indicated previously, water heated and falling back into the water chamber W is circulated through the heat exchanger H. Thus, a pump 42 is installed beneath the water chamber W and is provided with an inlet 43 leading downwardly from the water chamber W. An outlet pipe 44 extends to the coils 45 of the heat exchanger H, with a return pipe 46 discharging back into the water chamber W. Although other liquid to gas heat exchangers may be utilized, the preferred heat exchanger H is provided with coils 45 between which multiple layers of a mesh or cloth-like foraminous metal body having a plurality of interstices is clamped between each adjacent pair of coils, to provide a metal to metal contact with the coils over a large portion of their surfaces. This is conveniently accomplished by the mesh layers 47 being provided with crushed and compacted areas 48, as in FIG. 6.

The manufacture of the preferred mesh and coil construction of the heat exchanger H is illustrated by the initial position of the coils 45 in FIG. 7, which coils are spaced apart and between which the layers of mesh are interposed. Each mesh 47 extends between two coils but has a slit in one side to fit over and under one of the coils and thereby be able to be compressed against the coil and also extend beyond the coil. Each mesh 47 is generally in a plane which will be slanted with respect to the axes of the coils 45, due to the spiral relation of the coils, even when each loop is generally a rectangle, as in FIG. 4. With the coils and layers of mesh thus assembled, as shown in FIG. 7, perforated plates 50 and 51 of FIG. 5 are placed against the outer layers of mesh at each end of the coil and mesh assembly, then compressed, such as hydraulically, until the coils 45 are as close to each other as possible. When this compression is accomplished, a shell for the heat exchanger may itself be compressed onto the coil and mesh assembly. This shell may comprise an upper wall 52, a lower wall 53 and side walls 54, with the upper wall integral with one side wall and the lower wall integral with the opposite side wall. The two angular sections of the shell are compressed about the coil and mesh assembly until the opposite edges meet and may be joined by welding at corners 55. Flanges 56 on the perforated plates 50 and 51 are also attached, as by tack or spot welding, to the top and bottom walls, in order to maintain the coil and mesh assembly in compressed condition after removal of the compressing device.

The mesh layers 47 may be woven wire cloth, with copper being the preferred metal used in view of its high rate of heat conduction, as well as its tendency to retain a bend or curvature applied to it and for several wires to compact together. The wires of the copper mesh need not be round but may be flat or have any other cross sectional shape. Also, a mesh layer of copper wool similar to steel wool may be utilized, as long as some threads or fibers of the wool extend from the compressed area 48 to the lateral edges of the coil and mesh assembly. Also, it is advantageous that threads or fibers of the mesh extend longitudinally, i.e. from end to end of the coil and mesh assembly, in order to conduct heat from the periphery of the coils to as many areas of the heat exchanger as possible.

It will be understood that, although copper is the preferred metal of which the mesh layers 47 are formed, other metals may be utilized, even though the coefficient of heat transmission might be somewhat reduced. Also, the fibers of another metal may have a lesser tendency to stay in any position in which placed, as by compression. Nevertheless, copper is the preferred metal and exhibits a greater coefficient of heat transmission to air passing through the heat exchanger than other materials considered.

The coils 45 are also preferably formed of copper, although a brass or other metal may be utilized, the desideratum being the ability of the coils to be compressed, as from the condition of FIG. 7 to that of FIG. 6, without material damage and also to compress the mesh layers between the coils.

The lower heater L is utilized for picking up additional heat from the cooking equipment E and supplying that heat to water flowing therethrough from the water chamber or spray wash collector and being pumped to the heat exchanger H by the same pump 42 through the pump outlet pipe 44, which passes through the common wall 20, as does the return pipe 46 which is normally spaced longitudinally from the pump pipe 44 and therefore is seen in FIG. 3 but is not visible in FIG. 1. The heater L is shown as in a position immediately behind cooking equipment E and therefore is adapted to receive heat radiated or conducted in that direction, but may be placed at any other position at which there is heat. The heater L is supplied by a pipe 60 from the water chamber to feed a lower pipe 61 and a series of coils to an upper pipe 62. Between lower pipe 61 and upper pipe 62, the pipe extends back and forth, from side to side, with an alternating wide coil 63 at the left and 64 at the right. In this way, a greater length of pipe may be used within the compartment, which is between a downwardly slanting front wall 65, a bottom wall 66 and a layer of insulation 67, which may cover the rear side of the pipe coils. The flow through pipe 60 and the heater L may be controlled by a solenoid valve 68 energized by current supplied through wires 69, with the heated water being supplied by a pipe 70 to the inlet pipe 43 of pump 42. The solenoid valve may be controlled by a thermostat 71 of FIG. 1, which may be placed in a position either adjacent or remote from the ventilator, which will reflect as accurately as possible the need for heat in the makeup air supply to the room, or other enclosure, in the event the heat exchanger H is placed at a position remote from the ventilator. The signals to the solenoid valve 68 are carried by wiring housed in a conduit 72.

The heater L' illustrated in FIGS. 8 and 9 is similarly located behind a rearwardly slanting, front wall 65, but wall 65 is part of the heater, the water being supplied through pipe 60 to the lower end plate 75 of the heater, to be discharged from an outlet 76 which extends from top plate 77 of the heater, as to the solenoid valve 68 of FIG. 2. The heater also includes end walls 78 and a back wall 79 spaced from the front wall 65. A series of baffles 80 extend horizontally, with the baffles alternately being connected to and spaced from each of the end walls 78, so that space 81 is formed between the end of each alternating baffle and the adjacent end wall 78 and a space 82 is formed between the ends of each other alternate baffle and the opposite end wall 78. As will be evident, the liquid flowing through the heater, as illustrated in FIG. 8, will pick up heat from the entire area of front wall 65, between the top and bottom of the heater. Each baffle 80 is provided with an upstanding flange 83 and a downwardly extending flange 84, the latter of which may be attached to the front wall 65 by tack welding or spot welding. The flanges 83 may then be attached to wall 79 by plug welding. Merely a reasonable fit of the flanges against the inside of the respective walls is necessary, since any leakage between one space between the baffles and the next upper space is at a minimum. In any event, a slight leakage at any point does not detract from the efficacy of the heater.

The alternate heater L' is utilized in the same manner as the heater L, insofar as control of the flow through the heater to a pump for pumping water to the heat exchanger H, as through a solenoid valve controlled by a thermostat or any other suitable mechanism for effecting control. It will be noted that heater L' is more satisfactory than heater L for severe weather conditions, since the water is retained in heater L' for a longer time, assuming the same rate of flow through the heater. It will also be noted that more than one heater L or L' may be utilized and that two or more pumps, each operating in conjunction with a heater L or L' and both supplying one heat exchanger, may be used for very low outside temperatures. The heater L' may also be positioned at any place which will supply heat, such as between cooking equipment or ventilators, or even on the ceiling.

As illustrated in FIG. 10, a heat exchanger H may be mounted separately from the makeup air device M', which supplies makeup air to the ventilator V. Heat exchanger H may be placed in the same room or in a room different from the room in which the ventilator V and cooking equipment E are placed. As before, a suction blower B pulls air and possibly other vapors through a duct 22, as indicated by the arrow 85, with suction blower B being mounted on a roof section 86. A blower B' furnishes makeup air for the ventilator V through a duct 25', as indicated by the arrow 87, and is mounted on a roof section 88, preferably spaced from the roof section 86, to prevent cooking odors, discharged from blower B, being sucked into blower B', and particularly an adjacent blower B''. Blower B'' supplies air to heat exchanger H through a duct 89, while the treated air is discharged from the heat exchanger into the same room as the ventilator, or a different room, as indicated by the arrow 90. An additional duct, extending in the direction of arrow 90, may carry the treated air to another room, if desired. As before, water from the water bath of the ventilator V may be pumped to the heat exchanger through a pipe 44' and returned through a pipe 46'.

The alternative embodiment illustrated in FIGS. 11–17 is similar in many respects to the previous embodiments described above, including a thermostat 71 and a wiring conduit 72. As in FIGS. 11 and 12, the inlet air flows over the curl or convex lip 17 at the upper end of a front plate 16 of a ventilator V'. The air is directed into the inlet opening by a concave plate 15, and the air passes around an adjustably mounted curved baffle 14 having a planar lip 13. Thus, the air passes between lip 13 and front plate 16 to enter the water chamber W and drive the water therein against the rear wall 19 of chamber W, then to pass upwardly and impinge against a concave baffle 91 supported by an upper horizontal flange 92. The rear wall 19 of the ventilator, as well as the bottom 18 of the water chamber, are separated by a dead air space from any wall or equipment, the dead air space being formed by a false rear wall 93 and an angular false bottom wall 94. Also, the top 21 of the ventilator is extended rearwardly to the rear wall 93. From above plate 15 and flange 92, the air, after grease, fumes and the like have been separated therefrom in the water bath, passes upwardly in a duct 22 to a blower, such as corresponding to the blower B of FIG. 10. The upper portion of the ventilator and a storage space P within a makeup air device M'' are separated by a common wall 20, as before, with an air space A beyond the storage space. A top wall 21' extends over the makeup air device, with a bottom plate 34' formed as a horizontal extension of the plate 15. Plate 34' has an angularly depending flange 35' on which is adjustably mounted a plate 36' having a lip 37', as shown, to adjust the amount of makeup air which may be passed to the ventilator intake through a slot S''.

Water collected in the water bath chamber W is supplied through a strainer by a pipe 44' to a pump, as described below in connection with FIGS. 16 and 17. Water from the pump is supplied by a pipe 95 to a heat exchanger H having coils 45', about which a copper mesh is preferably packed and compressed into a deformed contact with the turns of the coils, as described previously. The heat exchange water is discharged from the coils of the heat exchanger H through a pipe 46' which extends to a position in the ventilator adjacent the juncture of plate 15 and common wall 20 and to connect with a laterally extending manifold 96 having a series of spray nozzles 97 attached thereto, for spraying the water discharged from the heat exchanger onto the inner walls and surfaces of the ventilator. A similar manifold 98 is mounted to extend laterally of the juncture between rear wall 19 and top 21 of the ventilator, carrying a series of spray nozzles 97 which are adapted to discharge a cleaning solution, against inner surfaces of the ventilator above the pipe 96. However manifold 96 is supplied with a cleaning solution periodically, as described later.

A partition 99 separates the heat exchanger H from the remainder of the air chamber A, but leaves the bottom of heat exchanger H exposed, so that the flow of makeup air to be tempered is upwardly through the heat exchanger, then laterally for passage horizontally through a slot S or downwardly through a slot S'. Depending upon the height of the room, the top 21 and 105 of the apparatus may be spaced a few inches from the ceiling 100 of the room, as indicated, or if the ceiling is higher, the top of the apparatus may be spaced a greater distance, such as several feet, from the ceiling. In either event, the tempered air directed laterally through the slot S tends to stratify, so as to mix with the air in the top portion of the room, which is normally the highest temperature air in the room, except, of course, normally over the cooking equipment. Stratifying and so mixing, the air directed through the slot S will carry for a considerable distance into the room, sometimes to the opposite wall thereof. By mixing as it goes along, this air stream prevents strong eddy currents and the like from impinging against the personnel operating the cooking equipment.

A portion of the air from chamber A moves downwardly adjacent the front end of the chamber, to pass around the edge of lip 37' and be directed through slot S'' diagonally upwardly. Slot S'' is between plate 35', 36' and an angular plate 101, spaced from a plate 39' and between which insulation 33 is disposed. The plate 39' extends to the bottom 38' of a front depending leg of the makeup air device M'', to provide space for a lamp 102, with a lamp glass 103 mounted in a suitable slot in plate 39'. The front depending leg of the device includes an outer plate 30' and an inner plate 32', with insulation 33 therebetween. Air discharged through the passage between plates 35' and 101 moves along the underside of horizontal plate 34' to be directed into the inlet of the ventilator, along with fumes, smoke, grease and the like rising from the cooking equipment. This air flow tends to produce a suction along plate 39' which may draw air from the room around the lower plate 38'. This air displacement may, in turn, produce a movement of smoke and the like into the room, to replace air displaced by such suction, with the result that smoke may curl below the lower edge of the front leg of the apparatus and into the room. The air directed downwardly through slot S' moves downwardly along wall 30' and then passes around the bottom of the leg and up to the air stream moving beneath plate 34', thereby avoiding the suction effect on air within the room.

It might be observed that a portion of the air discharged laterally through slot S, or more accurately, air which such discharged air replaces, may constitute a certain proportion of the makeup air supplied to the ventilator. Of the 80% to 90% of makeup air supplied by the device M'' to the ventilator, a proportion is through the slot S'', such as on the order of 20% to 40%, with 10% to 20% coming through the slot S' and 30% to 50% coming from air displaced by the air discharged through slot S. The remainder, i.e. 10% to 20% of the total, will normally be supplied by movement of air from other rooms into the room in which the cooking equipment is installed. It is desirable that there be always flow of air from other rooms into the cooking room, to avoid the migration of cooking odors into other rooms, such as a dining area.

Figure 13:
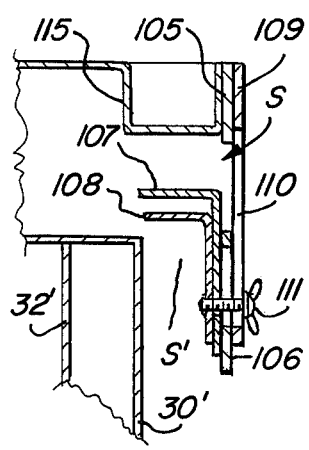
FIG. 13 is a fragmentary portion of FIG. 12, on an enlarged scale, showing particularly the device for adjusting the flow of air directed downwardly at the front edge of the attachment and tempered air ejected laterally.
Figure 15:
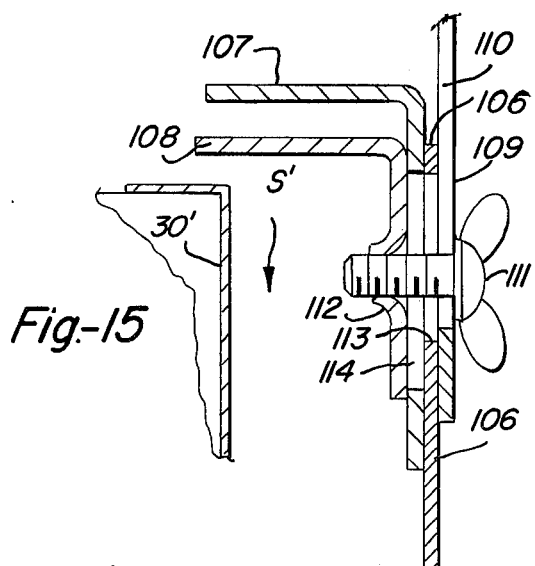
FIG. 15 is a fragmentary section, on a further enlarged scale, illustrating the adjustment mechanism and taken along line 15—15 of FIG. 14.
Figure 14:
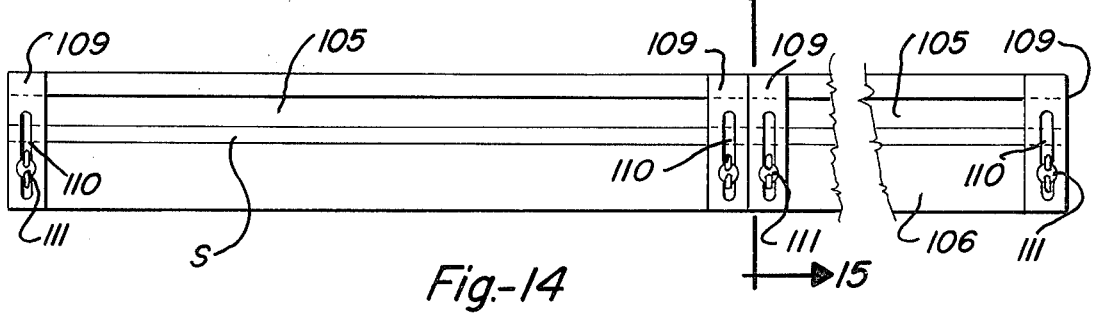
FIG. 14 is a front view of the adjustment area of the apparatus of FIG. 12.

The slot S, as in FIGS. 11 and 14, is bounded on the top by a plate 105 and on the bottom by a plate 106, with the area of the slot S being determined by an adjustable angle 107 of FIGS. 13 and 15 and the area of slot S' being determined by an adjustable angle 108. The two angles are adjustable upwardly and downwardly, with angle 107 being adjustable from the upper edge of plate 106 to the lower edge of plate 105, or approximately so, and the angle 108 being adjustable from a position substantially closing the slot S' to a position against the underside of angle 107. Thus, the position of the angle 107 determines a maximum distance which angle 108 can be moved upwardly, to increase the air discharge downwardly through slot S'. In effect, the air passing through the heat exchanger H is divided between the slots S and S'. In order to adjust the angles 107 and 108 to different positions and retain them in any adjusted positions, a series of attachment plates 109 are mounted on the front of the makeup air device, as in FIG. 11. The plates 109 are disposed in a vertical position, extending between the transverse plates 105 and 106, and are provided with upright slots 110 therein, for movement of wing bolts 111 to various vertical positions. It will be noted that the lower plates 106 are supported by the plates 109, except for the extreme ends of the former. Preferably, the adjustable angles 107 and 108 are divided into increments, such as on the order of 2 feet or more wide, not only to provide a shorter length and lesser weight for movement during adjustment, but also to provide for the further possibility that the tempered air flow might be desirably different at different places along the front of the apparatus, such as dependent on the type of cooking equipment beneath.

As in FIG. 15, the depending leg of angle 108 is provided with a threaded hole 112 for engagement with the wing bolts 111, which also extend through a slot 113 in lower plate 106 and a slot 114 in the depending leg of angle 107. As will be evident, the movement of angle 107, to which the wing bolt is attached, is limited by the lower and upper edges of slot 110 in plate 109. It will be noted, of course, that slots 110 and 113 remain stationary and are therefore preferably the same in length. As will be evident, the vertical adjustment of the angle 108 is determined not only by the limits of slots 110 and 113, but also by the limits of slot 114. Thus, angle 108 can be adjusted to an upper position wherein the wing bolt 111 abuts the top of slots 110 and 113 but not the bottom of slot 114. The position of wing bolt 111 in slots 110 and 113, of course, determines the adjusted position of angle 107. A closed channel 115 reinforces the upper front corner of the apparatus, with top 21' extending thereover and upper plates 105 being attached thereto. An access plate 117 may be removably attached to the underside of plate 34' at spaced longitudinal positions to permit access to storage space P, which may receive one or more fire extinguishers or the like.

Figure 16:
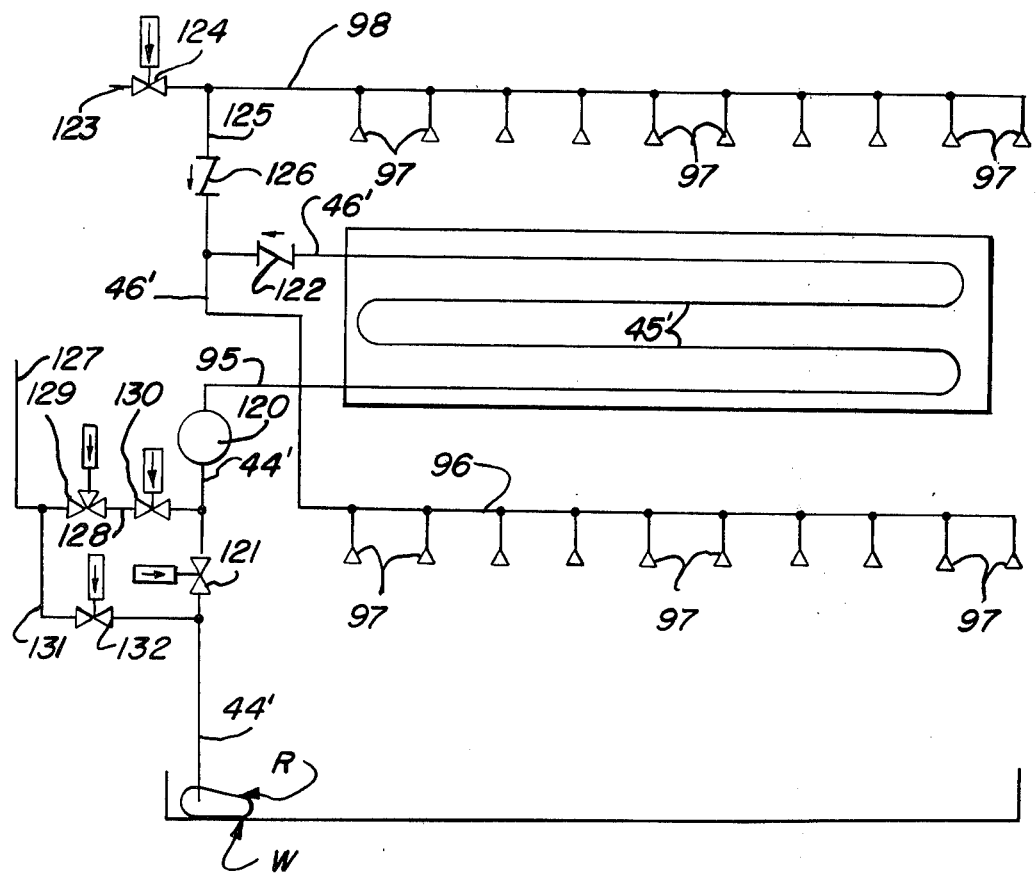
FIG. 16 is a diagram showing water control and distribution of cleaning water for the ventilator of FIG. 11.

As illustrated in FIG. 16, the pipe 44' may extend from a strainer R in the water chamber W to a pump 120 with a solenoid operated shutoff valve 121 interposed in the line. In addition, pipe 95 extends from pump 120 to the coils 45' of the heat exchanger H, with the water from the coils being discharged through the pipe 46' to spray pipe 96 on which spaced nozzles 97 are mounted. A check valve 122, interposed in pipe 46', prevents the flow of hot wash solution for the spray pipe 96 back to the heat exchanger.

As inlet 123 for detergent hot water from a supply thereof, including the normal hot water supply, is connected through a valve 124 with spray wash manifold pipe 98, to which a series of spaced spray nozzles 97 are attached. From pipe 123, a branch pipe 125 leads to pipe 46' and the spray pipe 96, so that the spray nozzles of both pipes 96 and 98 may discharge detergent hot water into the interior of the ventilator, for cleaning purposes. A check valve 126 is interposed in pipe 125 to prevent diversion of water through pipe 125 to pipe 98, while the heat exchanger H is in operation.

A hot water inlet 127 is connected with a pipe 128 in which a solenoid operated valve 129 is installed, for shutting off flow of hot water through the line during the wash cycle, as well as a temperature responsive valve 130 which admits hot makeup water for the heat exchanger when the temperature at the thermostat 71 calls for additional heating. Inlet pipe 127 is also connected with a flush line 131, which has a solenoid operated valve 132 interposed therein, and extends to the line 44', for back flushing the strainer R with hot water during the wash cycle, in order to return to the water chamber W any solids, such as grease or the like, entrained in or on the strainer.

Figure 17:
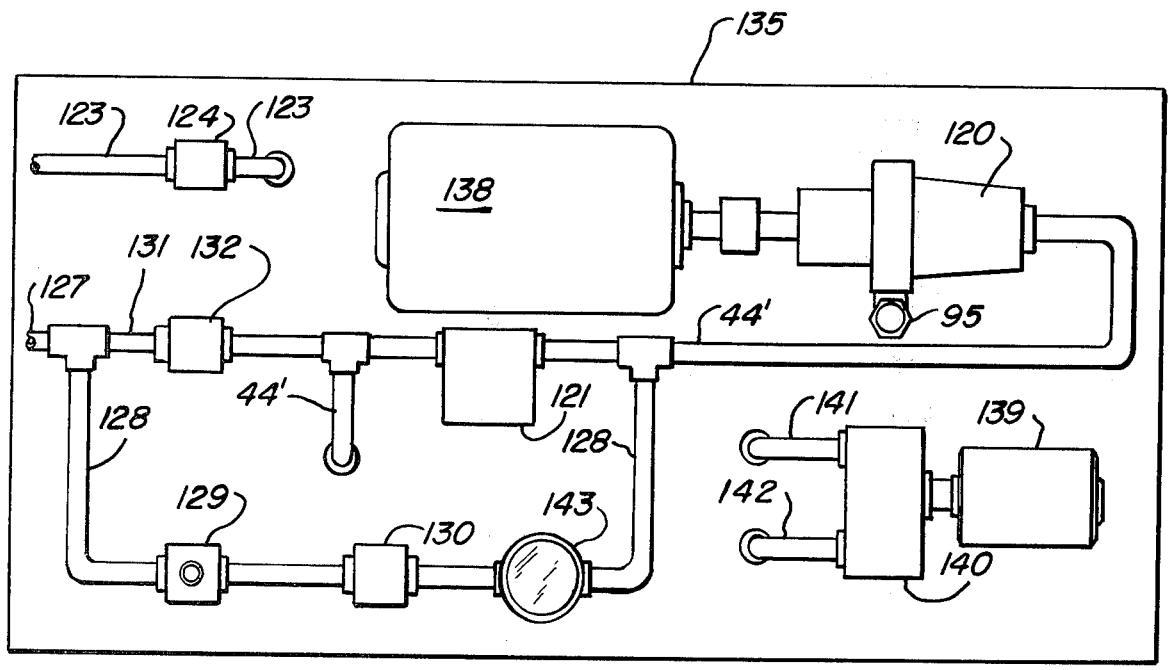
FIG. 17 is a bottom plan view of a control assembly, incorporated in the apparatus of FIG. 11.
Figure 20:
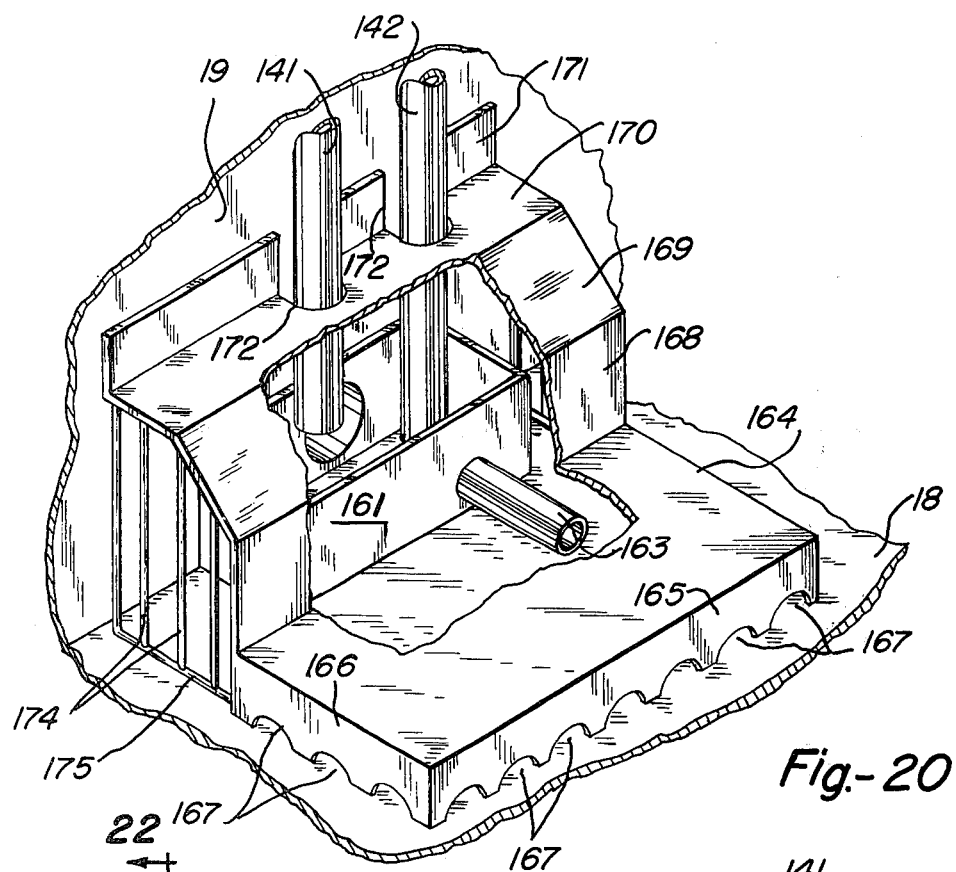
FIG. 20 is a fragmentary perspective view of a device for removing non-floating grease products from the water collection chamber.
Figure 21:
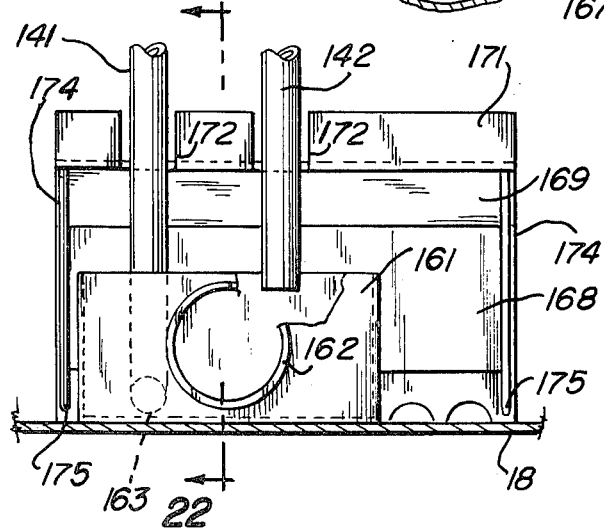
FIG. 21 is a rear elevation of the device of FIG. 20.
Figure 22:
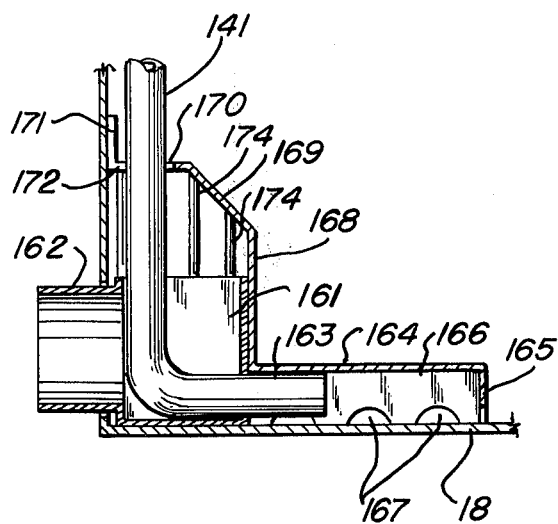
FIG. 22 is a lateral section taken along line 22—22 of FIG. 21.

The pump 120 and certain of the valves and piping may be mounted as a unit on the underside of a plate 135, as in FIG. 17. Plate 135 is adapted to be pulled outwardly from and pushed back into the space provided for the same, with plate 135 acting similarly to a drawer and the parts shown being dependent therefrom. Of course, the piping to and from the parts on plate 135 should be flexible, such as hoses, where necessary, to permit such movement. The plate 135 may be installed within a space at an upper corner of the makeup air device M", as in FIG. 11, behind a detachable panel 136 provided with louvers 137, to provide ventilation for cooling of a motor 138 for pump 120 and a motor 139 for a pump 140, shown in FIG. 17. An intake pipe 141 for pump 140 leads to a non-floating grease remover G of FIGS. 20–22, while an outlet pipe 142 returns to the grease remover. Also shown in FIG. 17 is the solenoid shutoff valve 121 for the inlet of pump 120. Detergent hot water inlet 123 is connected to pipes 98 and 125 of FIG. 16, leading to manifold pipes 96 and 98. The outlet 95 of pump 120 extends to the heat exchanger H, while the hot water inlet 127 is connected to pipe 131, in which the solenoid operated valve 132 is located and which extends to the pipe 44'. Also, hot water line 127 connects with the pipe 131, which in turn connects with pipe 44' just prior to pump 120. Shutoff solenoid valve 129 and control valve 130, which is responsive to the temperature measured at thermostat 71, shown in FIG. 11, are also located in pipe 128. A flow meter 143 may also be installed in pipe 128, so that the volume of hot water flowing under various conditions may be measured, to insure that an adequate supply of hot water to supply the demand can be furnished. As will be evident, with detergent hot water supplied through pipe 123, opening of solenoid valve 124 will permit the hot water to flow through pipes 125 and 128 with solenoid operated valve 129 open and temperature control valve 130 also open to varying degrees, for addition to the water passing to pump 120 through pipe 44' for supply to the heat exchanger. In back flushing the strainer R, the pump 120 is stopped and valves 121 and 129 are closed, while valve 132 is opened to supply hot water to pipe 44' and thence to the strainer R.

Figure 18:
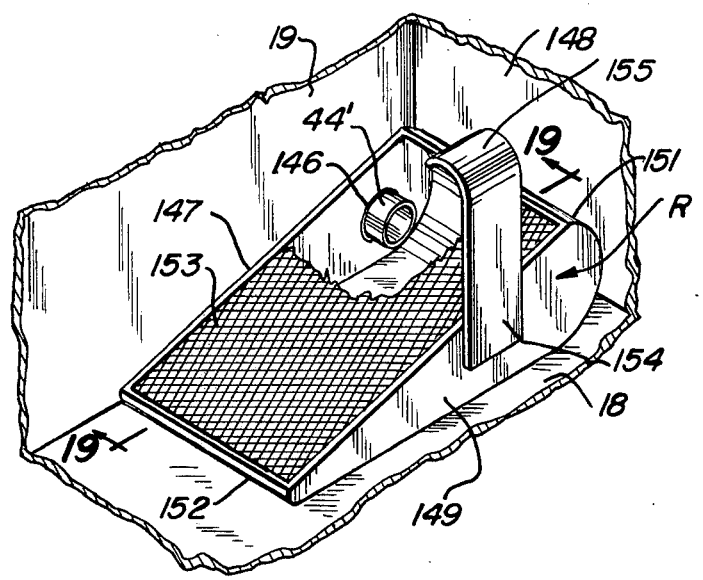
FIG. 18 is a fragmentary perspective view of a corner of the water collection chamber, showing a strainer through which water, possibly containing grease or the like, passes for flow to a heat exchanger.
Figure 19:
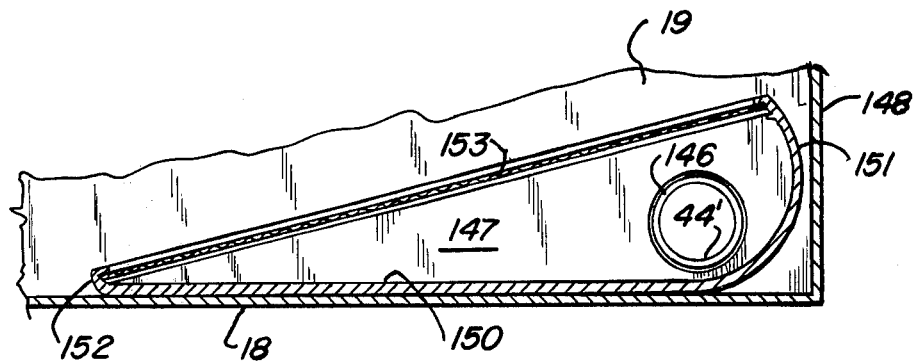
FIG. 19 is a longitudinal section of the strainer, taken along line 19—19 of FIG. 18.

Strainer R, as in FIGS. 18 and 19, is removable for cleaning, if desired, and therefore has a hole 146 in a side plate 147 which fits over the end of pipe 44', which in turn extends through the rear wall 19 of the water chamber adjacent an end wall 148. Strainer R also includes an opposite side plate 149 and a bottom plate 150 having a longer arcuate flange 151 at one end and a shorter arcuate flange 152 at the opposite end. A sloping screen 153 is attached to the top of triangular side plates 147 and 149 and to the top of end flanges 151 and 152. Screen 153 may be a fine screen, as on the order of 200 mesh. A handle 154 is attached to the side plate 149 and is provided with a hook 155 so that the operator may place a finger under the hook to pull the strainer off the end of pipe 44' and then lift it out of the ventilator, as for cleaning or inspection purposes.

The water chamber W is normally provided with an overflow device which maintains the desired level of water within the chamber, so that grease removed by the washing which tends to float on top of the water, should flow out through an outlet 160 of FIG. 12. However, there are situations when grease becomes waterlogged and tends to settle to the bottom of the wash chamber. Thus, it may be desired to install the device G of FIGS. 20–22 for circulating non-floating grease from the bottom of the wash chamber to an outlet and also for pumping out the entire contents of the water chamber during the wash cycle.

The non-floating grease removal device G includes an open topped box 161, centrally located in the ventilator and having an outlet connection 162 for the drain pipe 160. When the level of water in the water chamber W becomes higher than the sides of box 161, when the water is quiescent, water will overflow into box 161 to carry floating grease with it. Also, some overflow will occur when the water is forced rearwardly and upwardly against back wall 19. However, as indicated above, there may be non-floating grease products which tend to accumulate in the water chamber and increase the difficulties of cleaning. Thus, a flow along the bottom 18 from each end of the water chamber is created by suction of pump 140 of FIG. 17 through pipe 141 and particularly the lower end 163 thereof, which extends through the front of box 161 to a position close to bottom 18, as in FIG. 22. Pump discharge pipe 142 terminates below the upper edge of box 161, so that the water containing non-floatable grease will be discharged into the box, for flow through outlet 162. A strainer for preventing larger objects, such as washing cloths, from clogging the pipe suction end 163 or the outlet 162 of box 161, includes a horizontal plate 164 having a depending front flange 165 and depending side flanges 166, each provided with spaced, semicircular openings 167 at the bottom. Thus, the openings permit only objects and the like smaller than the openings to pass to the pipe suction end 163. A rear flange may also be provided as a downward extension of an upright flange 168, and also may be provided with a slot to accommodate pipe 142. From the rear edge of plate 164, the upright flange 168 and an angled flange 169 extend to a top plate 170, from whose rear edge a flange 171 extends upwardly, being engageable with rear wall 19, as in FIG. 22. A pair of slots 172 which clear pipes 141 and 142, permit the positioning of flange 171 against the rear wall 19. Also, slots 172 permit the removal of the strainer for inspection or cleaning. The sides of the strainer below flanges 169 and 170 are open, except for spaced, upright rods 174 which prevent larger objects from flowing into box 161 or the suction end 163 of pipe 141. Rods 174 are held in position by connection across the bottom through lateral rods 175, attached as by welding to the lower ends of rods 174 and the lower rear corner of side flanges 166.

During operation of the ventilator of FIGS. 11–22, and during cool or cold weather, air from outside is delivered through duct 25 to the air chamber A, while heated water from the water bath is circulated through heat exchanger H. During warm weather, the water bath will normally maintain a lower temperature than the outside air, so that water from the water bath may be used to cool outside air. The slots S, S' and S" are adjusted to deliver the correct amount of air to the upper portion of the room, downwardly along the front of the makeup air device, and angularly upwardly toward the intake of the ventilator, respectively. The proper settings of the adjustable devices which control the proportion and flow of air through slots S, S' and S" may require trial of the apparatus, to determine the effect of various settings to obtain the preferred optimum use of the apparatus, such as within the parameters heretofore set forth. The first requirement is, of course, the adequate removal of the gaseous stream rising from the cooking equipment.

Cleaning cycles may be predetermined by a conventional time arrangement, either clock actuated or electronic in nature, which is preferable, to reliance on the operator to push a start button for the cleaning cycle. During the cleaning cycle, initially the pump 140 is started until it removes the water of the water bath. During this time, the blower for duct 22 may continue in operation, but pump 120 is shut down. When the water bath is essentially removed, such as after a period of 3 minutes, the solenoid for valve 124 may then be energized to open this valve and cause hot water to flow through a conventional detergent dispenser, the cleaning solution thus produced being discharged through nozzles 97 to clean the interior surfaces of the ventilator. Concurrently therewith and for a concurrent period of time as long as necessary, the solenoid for valve 132 is energized to open this valve, while valve 121 is closed, so as to supply house hot water to pipe 44' and back wash the strainer R, the hot water flushed through strainer R mixing with the detergent solution. The cleaning time will normally depend on the conditions of use of the ventilator. For a light production of grease and the like, on the order of 2 minutes of cleaning may be all that is necessary; on the other hand, for a heavy production of grease and the like, on the order of 3 minutes of cleaning may be necessary. After cleaning, normal operation of the apparatus may be resumed, without removing the cleaning solution remaining in the tank, since pump 120 may be operated to pump the cleaning solution through the coils 45' of the heat exchanger H, to clean the insides of the coil. The cleaning solution, with its higher temperature, is unobjectionable for heating incoming air, when such air is to be heated. As more water is furnished to the water chamber W, through the usual makeup valve, the cleaning solution will become diluted within a time and normal operation will ensue. As will be evident, the sequence of events during washing may be controlled automatically, through a timing device and switches for solenoids of the various valves.

Although preferred embodiments of this invention, as well as alternative constructions, have been illustrated and described, it will be understood that other embodiments may exist and that various changes may be made without departing from the spirit and scope of this invention.

What is claimed is:

1. Apparatus for tempering makeup air including a grease extraction ventilator for cooking equipment in a room, which cooking equipment produces a gaseous stream containing fumes, smoke and grease products, comprising:
water contact means in a passage of said ventilator, said passage extending to a duct connected to means for producing suction and said passage having an intake above said cooking equipment, said suction pulling said gaseous stream through said intake and into engagement with said water contact means, to remove said products from said stream;
air supply means including duct means connected to blower means for supplying air;
means connected with said air supply means for directing a first portion of said air as makeup air to the area of said intake of said ventilator;
a heat exchanger for producing heat exchange between air and water;
pump and pipe means for supplying water from said water contact means to said heat exchanger for heat transfer;
means connected with said air supply means for supplying a second portion of said air to said heat exchanger for heat exchange with said water; and
means connected to said heat exchanger for directing said second portion of air, after heat exchange, to a selected area.

2. Apparatus as defined in claim 1, including:
pipe means returning water from said heat exchanger to said water contact means.

3. Apparatus as defined in claim 2, wherein:
sprays are connected to said pipe means and are disposed within said passage for spraying water returned from said heat exchanger into said water contact means.

4. Apparatus as defined in claim 3, wherein:
said water contact means includes a water bath and said water sprays are located above said water bath.

5. Apparatus as defined in claim 2, including:
a heat transfer device disposed adjacent said cooking equipment; and
means for controllably causing water from said water contact means to flow through said heat transfer device and to said pump means.

6. Apparatus as defined in claim 5, wherein:
said heat transfer device includes a series of generally coplanar coils disposed behind a wall of said ventilator and exposed to heat from said cooking equipment.

7. Apparatus as defined in claim 5, wherein:
said heat transfer device comprises a series of parallel baffles disposed between front, rear and end walls of said ventilator, the ends of said baffles being alternately spaced from said end walls.

8. Apparatus as defined in claim 5, wherein:
said means for controllably causing water includes means responsive to temperature at a position spaced from said cooking equipment and said ventilator.

9. Apparatus as defined in claim 1, wherein:
said room has a ceiling above said ventilator; and
said means for directing said second portion of said air is provided with a horizontal slot for discharging said second portion of said air into the upper portion of said room, for movement thereof in spaced, generally parallel relation to the ceiling of said room.

10. Apparatus as defined in claim 1, wherein:
an air chamber is positioned in said ventilator passage; and
said air supply means supplies both said makeup air and said second portion of air to said chamber.

11. Apparatus as defined in claim 10, wherein:
said ventilator intake is on the underside of said ventilator;
said means for directing makeup air toward said ventilator intake is on the underside of said chamber;
said chamber is provided with an upright front wall; and
means for directing a third portion of said air downwardly along said front wall of said chamber on the outside thereof.

12. Apparatus as defined in claim 1, wherein:
said heat exchanger is located at a point exteriorly of the room in which said cooking equipment and ventilator are located; and
said apparatus further includes means for discharging air, after passage through said heat exchanger, into a room exteriorly of the room in which said ventilator and cooking equipment are located.

13. Apparatus for supplying makeup air for a grease extraction ventilator for cooking equipment in a room, which cooking equipment produces a gaseous stream containing fumes, smoke and grease products, comprising:
water contact means in a passage of said ventilator, said passage extending to a duct connected to means for producing suction and said passage having an intake above said cooking equipment on the underside of said ventilator, said suction pulling said gaseous stream through said intake and into engagement with said water contact means, to remove said products from said stream;
an air chamber adjacent and in front of said ventilator passage, said chamber having a depending front wall;
air supply means duct connected to blower means and said chamber for supplying air to said chamber;
an adjustable discharge outlet on the underside of said chamber inwardly of said wall for directing air from said chamber toward said passage intake; and
adjustable means for directing air from said chamber downwardly along said front wall on the outside thereof for passage around the lower end of said front wall for flow to said air discharged from said outlet on the underside of said chamber.

14. Apparatus as defined in claim 13, wherein:
an upper portion of said front wall is provided with adjustable means for discharging air from said chamber in a horizontal direction to form a stream travelling generally parallel to the ceiling of said room.

15. Apparatus for tempering makeup air including a grease extraction ventilator for cooking equipment in a room, which cooking equipment produces a gaseous stream containing fumes, smoke and grease products, comprising:
water contact means in a passage of said ventilator, said passage extending to a duct connected to means for producing suction and said passage having an intake above said cooking equipment, said suction pulling said gaseous stream through said intake and into engagement with said water contact means, to remove said products from said stream;

a first air supply duct connected to blower means for supplying air;

means connected with said first duct for directing a first portion of air as makeup air to the area of said intake of said ventilator; a heat exchanger for producing heat exchange between air and water;

pump and pipe means for supplying water from said water contact means to said heat exchanger for heat transfer;

a second air supply duct connected to blower means and said heat exchanger for supplying a second portion of air to said heat exchanger for heat exchange with said water; and means connected to said heat exchanger for directing said second portion of air, after heat exchange, to a selected area.

16. In a grease extraction ventilator having a wash chamber in which grease, fumes, smoke and the like are subjected to contact with water and said water is collected in said chamber, a device for removing non-floating particles such as grease from said collected water, comprising:

a collection pipe extending to a position adjacent the bottom of said wash chamber;

pump means connected to said pipe for producing suction to remove water and non-floating particles from the bottom area of said wash chamber;

a box shaped structure having an open top disposed adjacent the bottom of said wash chamber;

drain means connected to said box for draining water and its contents from said box; and a return pipe connected to said pump for discharging water and non-floating particles into said box.

17. In a grease extraction ventilator as defined in claim 16, including:

shield means overlying said box but removable for cleaning and having passages therethrough to prevent flow to said box or to said collection pipe of articles, such as cleaning cloths; and said collection pipe extends to a point within said shield means.

18. In a grease extraction ventilator as defined in claim 17, wherein said shield means includes:

a first horizontal plate spaced from the bottom of said chamber and having a depending front flange and depending side flanges provided with shallow openings;

upwardly extending flange means extending to a second horizontal top plate disposed above said box;

a series of spaced rods extending downwardly from said second top plate and at each side of said box; and said second top plate being provided with slots to accommodate said collection pipe and said return pipe.

19. In a grease extraction ventilator as defined in claim 17, wherein said shield means includes:

plate means having depending flanges provided with shallow openings adjacent the bottom of said wash chamber; and means including a series of spaced rods extending downwardly to the bottom of said wash chamber, each of said depending flanges and spaced rods being positioned to intercept articles tending to flow into said box.

* * * * *